US008740735B2

(12) United States Patent
Rolando et al.

(10) Patent No.: US 8,740,735 B2
(45) Date of Patent: Jun. 3, 2014

(54) DAMPER PULLEY ASSEMBLY HAVING A SAFETY DEVICE

(75) Inventors: Adriano Rolando, Valperga Canavese (IT); Hervé Riu, La Murette (FR)

(73) Assignee: Dayco Europe S.r.l., Chieti (IT)

( * ) Notice: Subject to any disclaimer, the term of this patent is extended or adjusted under 35 U.S.C. 154(b) by 1017 days.

(21) Appl. No.: 12/526,707

(22) PCT Filed: Feb. 15, 2007

(86) PCT No.: PCT/IT2007/000101
§ 371 (c)(1),
(2), (4) Date: Oct. 23, 2009

(87) PCT Pub. No.: WO2008/099432
PCT Pub. Date: Aug. 21, 2008

(65) Prior Publication Data
US 2010/0099527 A1    Apr. 22, 2010

(51) Int. Cl.
*F16H 55/36* (2006.01)
(52) U.S. Cl.
USPC .......................................... 474/94
(58) Field of Classification Search
USPC .......................................... 474/94
See application file for complete search history.

(56) References Cited

U.S. PATENT DOCUMENTS

| 7,850,557 | B2 * | 12/2010 | Moriya et al. | 474/94 |
| 2006/0264282 | A1 * | 11/2006 | Moriya et al. | 474/94 |
| 2009/0318252 | A1 * | 12/2009 | Riu | 474/94 |

FOREIGN PATENT DOCUMENTS

| EP | 0 916 874 A2 | 5/1999 |
| EP | 1 279 807 A1 | 1/2003 |
| EP | 1 724 496 A1 | 11/2006 |
| FR | 2 730 782 A1 | 8/1996 |
| WO | WO 96/25611 A1 | 8/1996 |
| WO | WO 2005/085680 A1 | 9/2005 |

* cited by examiner

*Primary Examiner* — William E Dondero
*Assistant Examiner* — Robert T Reese
(74) *Attorney, Agent, or Firm* — Frommer Lawrence & Haug LLP; Ronald R. Santucci

(57) ABSTRACT

A damper pulley assembly has a hub; a seismic mass connected to the hub to define a dynamic torsional vibration damper; a pulley connected to the hub; elastic means for connecting the pulley in torque-transmitting mode to the hub; and one-way stop means for arresting the pulley in a first stop position with respect to the hub or the seismic mass in a first direction, when the elastic means reach a predetermined torsional load.

10 Claims, 3 Drawing Sheets

DAMPER PULLEY ASSEMBLY HAVING A SAFETY DEVICE

This application is a 371 of PCT/IT2007/000101 filed on Feb. 15, 2007, published on Aug. 21, 2008 under publication number WO 2008/099432 A.

TECHNICAL FIELD

The present invention relates to a damper pulley assembly having a safety device and preferably fitted to an internal combustion engine crankshaft to control the accessory device drive of a motor vehicle.

BACKGROUND ART

A damper pulley assembly normally comprises a hub connected rigidly to an internal combustion engine crankshaft; a pulley connected to the hub; and a seismic mass connected to the hub to define a dynamic torsional vibration damper.

More specifically, the pulley is connected, to rotate with respect to the hub, by an elastic member interposed between the pulley and the hub. The most commonly used elastic members are a ring of elastomeric material, or one or more metal spiral or helical springs.

Because of the increase in power absorption by the accessory devices driven by the accessory drive, the pulley is now subjected to severer stress than in the past.

When power absorption exceeds a given threshold, an elastomeric ring cannot guarantee transmission of the necessary torque, and is therefore replaced with a metal spring.

A metal spring has better heat resistance and, in particular, can be used at higher operating temperatures than an elastomeric ring.

Moreover, failure of the elastic member of a damper pulley assembly may arrest operation of the accessory drive and so endanger passengers and result in serious damage to the vehicle.

DISCLOSURE OF INVENTION

It is an object of the present invention to provide a damper pulley assembly designed to eliminate the aforementioned drawback.

According to the present invention, there is provided a damper pulley assembly as claimed in Claim 1.

BRIEF DESCRIPTION OF THE DRAWINGS

A preferred, non-limiting embodiment of the present invention will be described by way of example with reference to the accompanying drawings, in which.

BEST MODE FOR CARRYING OUT THE INVENTION

Figure 1:
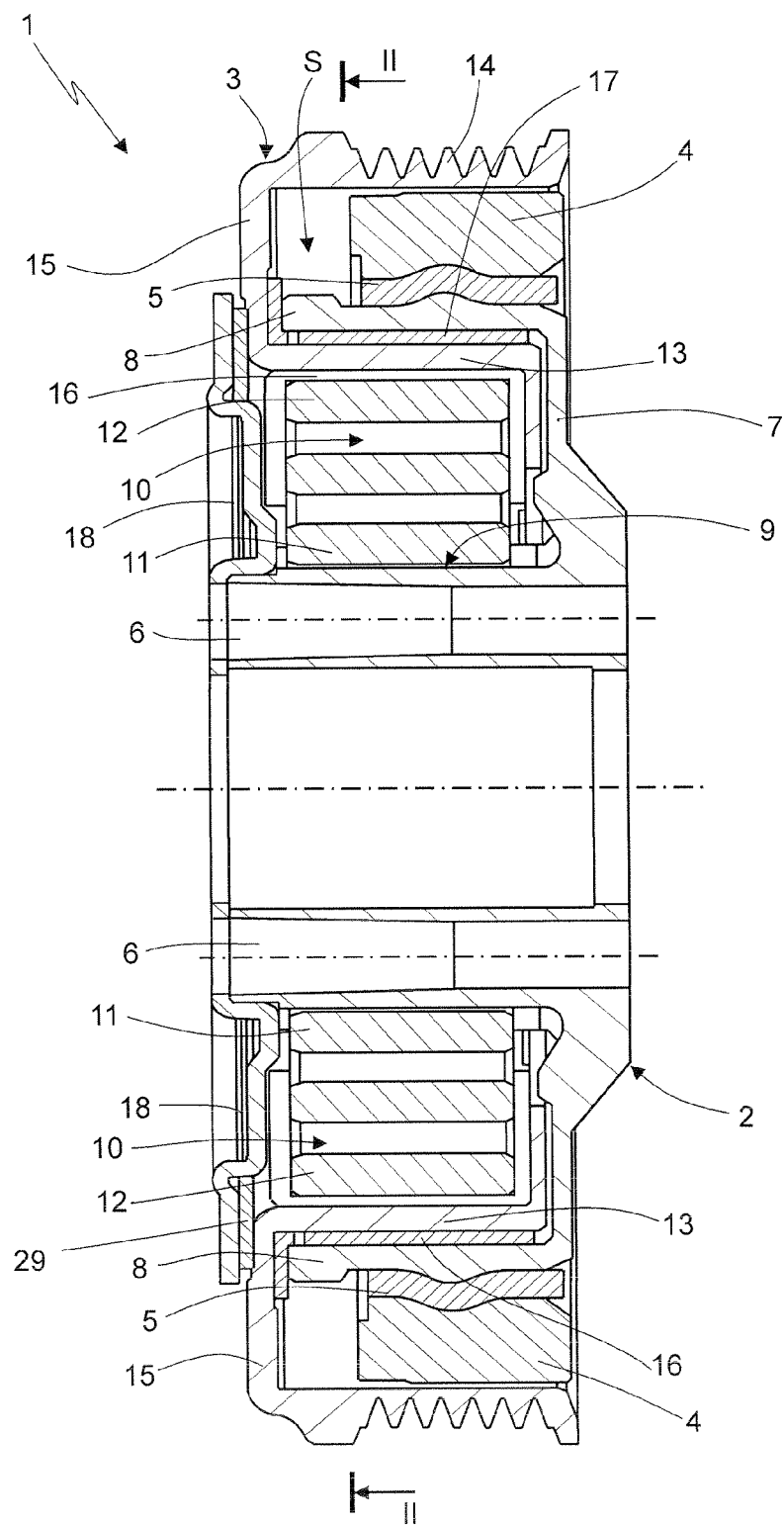
FIG. 1 shows a half axial section of the damper pulley assembly according to the present invention.

Number 1 in FIG. 1 indicates as a whole, a damper pulley assembly comprising a hub 2 connected rigidly to a crankshaft; an annular pulley 3 supported by hub 2; and a seismic mass 4 connected to hub 2 by a band 5 of elastomeric material to define a dynamic torsional vibration damper.

More specifically, hub 2 comprises a tubular portion having an axis A; a wall 7 extending from tubular portion 6; and a cylindrical wall 8 concentric with tubular portion 6.

More specifically, tubular portion 6, wall 7, and cylindrical wall 8 are arranged to define a C-shaped section and a corresponding cavity 9.

Cavity 9 houses an elastic member, preferably metal spiral spring 10, comprising an end portion 11 connected rigidly to tubular portion 6; a free end portion 12 connected frictionally to pulley 3; and a number of turns 10c interposed between end portions 11 and 12.

Pulley 3 has a C-shaped cross section, and comprises a cylindrical wall 13 interposed radially between end portion 12 and cylindrical wall 8; a multiple-groove wall 14 cooperating with a drive belt; and a lateral wall 15 connecting cylindrical wall 13 and multiple-groove wall 14.

More specifically, multiple-groove wall 14 surrounds seismic mass 4, which is connected to cylindrical wall 8 by band 5 and defines a gap S bounded laterally by lateral wall 15.

Damper pulley assembly 1 also comprises a bush 16 made of antifriction material and positioned contacting and between end portion 12 and cylindrical wall 13; and a ring 17 made of antifriction material and interposed axially between cylindrical wall 8 and lateral wall 15.

To secure pulley 3 axially to hub 2, damper pulley assembly 1 comprises an annular plate 18 connected rigidly to tubular portion 6, on the opposite axial side to wall 7.

More specifically, annular plate 18 supports a ring 29 of antifriction material, and is of such a diameter that ring 29 is positioned contacting pulley 3. The maximum diameter of annular plate 18 is preferably greater than that of cylindrical wall 13.

Figure 2:
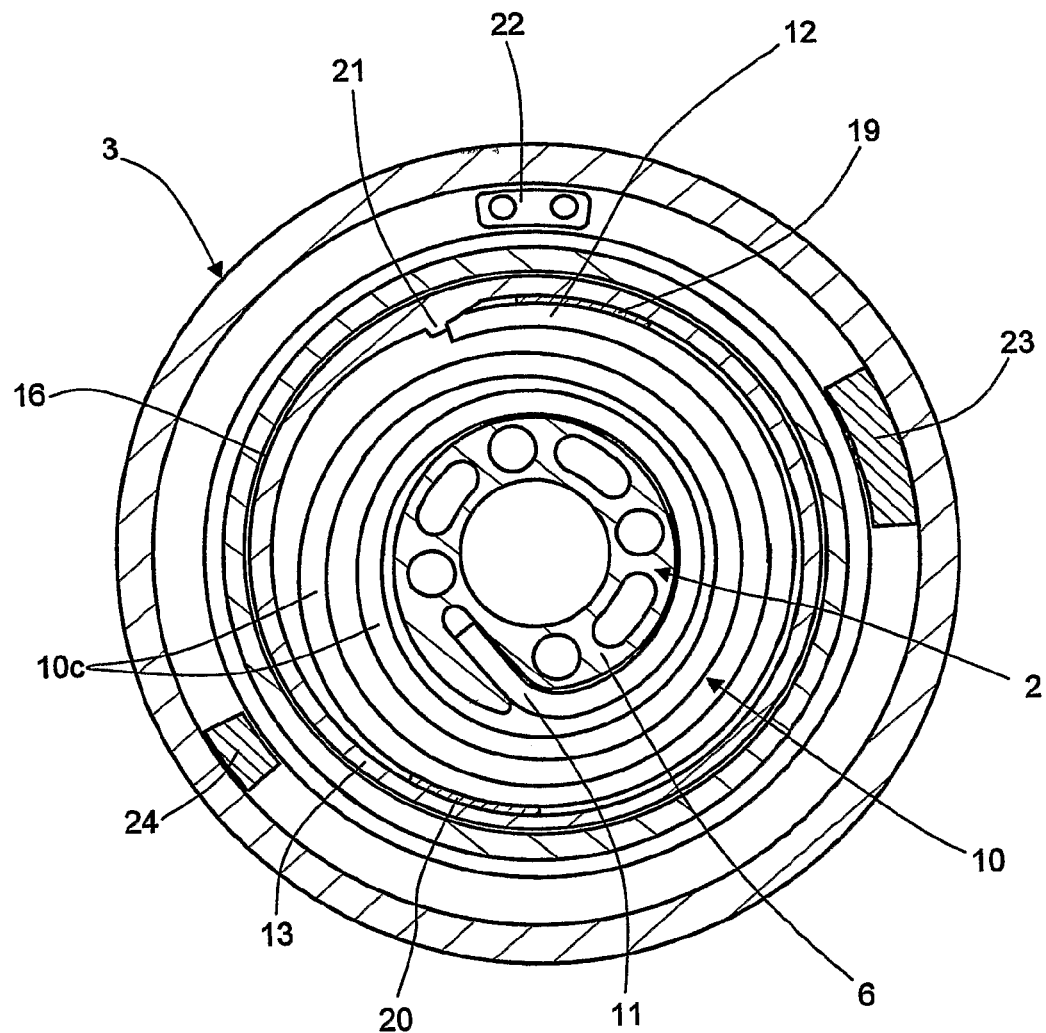
FIG. 2 shows a radial section along line II-II in FIG. 1.

FIG. 2 shows the way in which spiral spring 10 is connected to the pulley.

More specifically, damper pulley assembly 1 comprises a first and a second shoe 19, 20 connected rigidly to spiral spring 10. Shoe 19 is connected to end portion 12, and shoe 20 is spaced angularly apart from shoe 19 by an angle ranging between 140° and 190°, preferably between 150° and 180°, measured between corresponding portions of shoes 19, 20.

Shoes 19, 20 contact cylindrical wall 13 of pulley 3, and are preloaded radially against cylindrical wall 13 by spiral spring 10.

To transfer at least part of the torque between hub 2 and pulley 3, pulley 3 comprises a stop 21 extending radially from cylindrical wall 13 towards tubular portion 6, and defining a stop for end portion 12.

Damper pulley assembly 1 also comprises a safety device to prevent overloading elastic member 10.

More specifically, the safety device comprises an axial projection 22 connected rigidly to lateral wall 15 and movable, in use, inside gap S.

Gap S is defined circumferentially by a first and a second stop 23, 24, which define the angular position of pulley 3 with respect to seismic mass 4 in both rotation directions.

More specifically, stop 23, the size of projection 22, and the geometry of spiral spring 10 are such that stop 23 does not cooperate to transmit a substantial torque when end'portion 12 contacts stop 21 in a first relative rotation direction between hub 2 and pulley 3.

Stop 24, the position and size of shoe 20, and the size of stop 21 are such that shoe 20 is detached from, or at any rate is not jammed against, stop 21 when the relative rotation direction between hub 2 and pulley 3 is opposite the first rotation direction referred to above.

Figure 3:
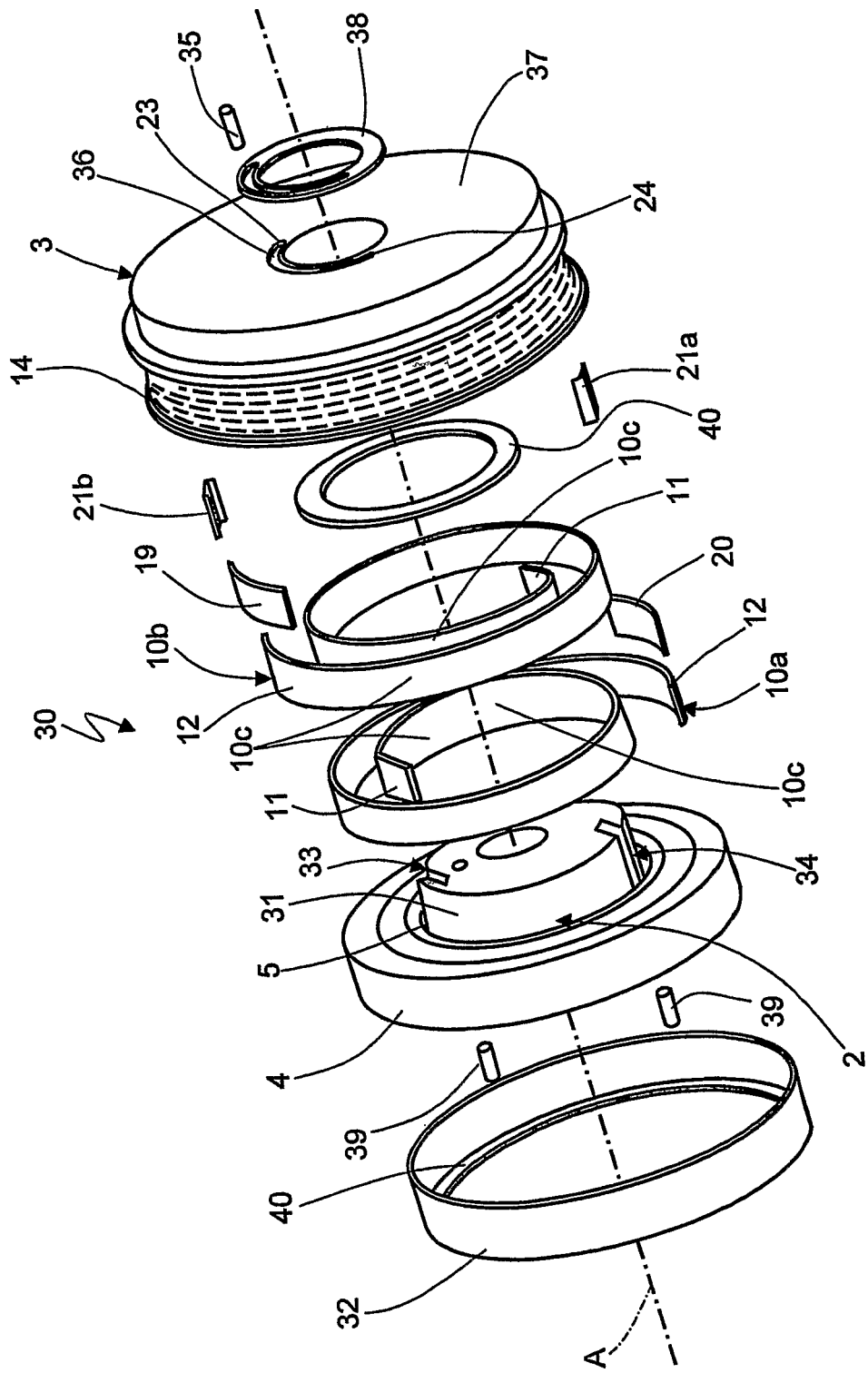
FIG. 3 shows an exploded view in perspective of a further embodiment of a damper pulley assembly in accordance with the present invention.

FIG. 3 shows a second embodiment of the present invention, in which parts structurally or functionally identical to those already described are indicated using the same reference numbers as in the description of damper pulley assembly 1.

More specifically, FIG. 3 shows a damper pulley assembly 30 similar to damper pulley assembly 1 except for the following.

In damper pulley assembly 30, hub 2 comprises a fastening portion 31 projecting axially with respect to seismic mass 4. Pulley 3 is supported by seismic mass 4, and a bush 32 is interposed radially between multiple-groove wall 14 and seismic mass 4.

In addition, damper pulley assembly 30 comprises a first and a second spiral spring 10a, 10b identical to each other and connected to fastening portion 31, alongside seismic mass 4.

End portion 11 of each spring 10a, 10b is connected rigidly to fastening portion 31, which, for the purpose, defines a first and a second groove 33, 34 axially symmetrical with respect to axis A.

Shoes 19, 20 are carried by respective end portions 12 of springs 10a, 10b, and cooperate frictionally with an inner surface(not shown) of multiple-groove wall 14.

Damper pulley assembly 30 also comprises a first and a second stop 21a, 21b mounted on the inner surface of multiple-groove wall 14 to define respective stops cooperating selectively with respective end portions 12 of springs 10a, 10b.

In addition, the safety device of damper pulley assembly 30 comprises a pin 35 connected rigidly to hub 2 and movable inside a groove 36 defined by pulley 3 and bounded circumferentially to perform the function of stops 23, 24.

More specifically, pulley 3 of damper pulley assembly 30 comprises a lateral wall 37 projecting from an end edge of multiple-groove wall 14, and having an inside diameter smaller than the radial position of pin 35 to define groove 36.

In addition, damper pulley assembly 30 comprises a reinforcing member 38 fitted to lateral wall 37 and defining a groove identical to and superimposed on groove 36.

In use, reinforcing member 38 provides for withstanding the contact pressures exerted by pin 35.

In addition, damper pulley assembly 30 comprises two pins 39 for locking end portions 11 rigidly inside respective grooves 33, 34 and simplifying assembly of damper pulley assembly 30. During assembly, in fact, end portions 11 tend to withdraw from respective grooves 33, 34.

The axial position of pulley 3 with respect to hub 2 is defined by bush 32, and by a ring 40 of antifriction material interposed axially between fastening portion 31 and lateral wall 37. More specifically, bush 32 comprises a flange 41 facing axis A, and is fitted inside multiple-groove wall 14 so as to be integral with pulley 3 and radially slack with respect to seismic mass 4.

Damper pulley assembly 1 operates as follows.

When damper pulley assembly 1 runs the accessory drive, end portion 12 rests against stop 21, and the torque so generated tends to unwind spiral spring 10 and increase the radial load on shoes 19, 20, so that part of the torque is transmitted by contact with stop 21, and the rest by friction between shoes 19, 20 and cylindrical wall 13.

In this operating condition, projection 22 does not contact stop 23 when the torque transmitted remains below a given value.

When spiral spring 10 is subjected to particularly severe stress, projection 22 contacts stop 23 to limit the torque on spiral spring 10.

When pulley 3 is in the above first stop position, turns 10c of spiral spring 10 are detached from one another.

As pulley 3 tends to overtake hub 2, end portion 12 and stop 21 separate, and shoes 19, 20 slide on cylindrical wall 13, thus preventing intense instantaneous stress from being transmitted to the belt.

Pulley 3 can rotate with respect to hub 2 until shoe nears stop 21. Further rotation of pulley 3 is prevented by projection 22 contacting stop 24, which defines a second stop position. Contact of stop 23 by projection 22 prevents shoe 20 from jamming against stop 21.

More specifically, shoe 20 is not damaged if torque is transmitted between hub 2 and pulley 3 predominantly by projection 22 and stop 23 when pulley 3 is in the second stop position.

In the event of damage or breakage of spiral spring 10, projection 22 can contact stops 23, 24 to ensure emergency operation of the accessory drive.

Damper pulley assembly 1 can also be mounted on a start-stop internal combustion engine.

A start-stop internal combustion engine can be turned off when the vehicle is stopped temporarily, e.g. at a red light, and turned on automatically by the driver pressing the accelerator. Moreover, the accessory drive of a start-stop engine may be connected to a reversible electric machine for both charging the battery and starting the engine. In which case, the torque on the pulley connected to the crankshaft may change direction, depending on whether the crankshaft is running the drive, or the reversible electric machine is running to start the engine.

Damper pulley assembly 1 may be used in a start-stop engine connected to a reversible electric machine, and, when the crankshaft runs the drive, end portion 12 contacts stop 21, whereas, when the reversible electric machine is running to start the engine, projection 22 contacts stop 24, and the crankshaft is rotated.

The operating principle of damper pulley assembly 30 is identical to that of damper pulley assembly 1, the above description of which also applies to damper pulley assembly 30.

More specifically, the stop positions of pulley 3 are defined by groove 36, the circumferential ends of which perform the same function as stops 23, 24.

The advantages of damper pulley assembly 1, 30 according to the present invention are as follows.

Projection 22 and pin 35, together with stop 23, prevent overloading of the spiral spring in anomalous operating conditions of the engine.

Stop 24 prevents damage of shoes 19, 20 when pulley 3 reaches the second stop position, and also permits use of damper pulley assembly 1, 30 on start-stop engines.

Both stops 23, 24 permit emergency operation of the accessory drive in the event of damage to spiral spring 10, 10a, 10b, thus allowing the user to reach the nearest service station, as opposed to being stranded wherever elastic member 10 breaks down.

The specific configuration of damper pulley assembly 1 provides for reducing the maximum axial dimension, and that of damper pulley assembly 30 for reducing the maximum radial dimension.

Non-contact of metal turns 10c prevents damage to the respective surfaces resulting in reduced working life of spiral spring 10. Even small nicks on the surface of the spiral spring, in fact, have been found to aggravate crack or chemical etching propagation resulting in premature failure of the spring.

Clearly, changes may be made to damper pulley assembly 1, 30 as described and illustrated herein without, however, departing from the scope defined in the accompanying Claims.

When low power transmission is involved, pulley 3 need not comprise stop 21, 21a, 21b, and spiral spring 10 may be connected only frictionally to pulley 3.

To prevent metal-metal contact of adjacent turns 10c, spiral spring 10, or portions of it, may be coated, though this solution is more expensive than the one illustrated.

The mechanical characteristics of the coating are inferior to those of the metal base material, so that, in use, torque is transmitted predominantly by the metal material.

In this case, the coating may contact the adjacent turn 10c directly, but the metal portions of adjacent turns are still detached radially.

The material of superior mechanical characteristics need not be a metal.

Damper pulley assembly 30 may easily be adapted to comprise a single spiral spring, just as damper pulley assembly 1 may comprise a number of springs to achieve an axially symmetrical structure, which provides for easier dynamic balance of the damper pulley assembly.

What is claimed is:

1. A damper pulley assembly comprising a hub; a seismic mass connected to said hub to define a dynamic torsional vibration damper; a pulley connected to said hub; and elastic means for connecting said pulley in torque-transmitting mode to said hub; wherein by comprising a first one-way stop means for arresting said pulley in a first stop position with respect to said hub or said seismic mass in a first direction, when said elastic means reach a predetermined torsional load;

a second one-way stop means for arresting said pulley in a second stop position with respect to said hub or said seismic mass in a second direction opposite said first direction;

wherein said first one-way stop means comprise a projection carried by one of said pulley and said hub or by said seismic mass; and a first stop carried by the other of said pulley and said hub, or by said seismic mass, wherein said second one-way means comprise a second stop which cooperates selectively with said projection, and wherein said elastic means comprise a spiral member made of a material at least predominantly stressed by the torque transmitted between said hub and said pulley when said pulley is in said first stop position; adjacent turns of said spiral member being radially detached when said pulley is in said first stop position; and further comprising a first and a second shoe carried by said spiral member; and in that said second stop has a fixed angular position, so that the torque between said hub and said pulley is transmitted predominantly by said second stop when said pulley is in said second stop position such that the second stop position corresponds to a substantially unloaded condition of the spiral spring.

2. A damper pulley assembly as claimed in claim 1, wherein adjacent turns are detached when said pulley is in said first stop position.

3. A damper pulley assembly as claimed in claim 1, wherein said pulley comprises a stop member; and in that said spiral member comprises a free end portion cooperating with said stop member.

4. A damper pulley assembly as claimed in claim 1, wherein said stop member is spaced angularly apart from said first and said second shoe when said pulley is in said second stop position.

5. A damper pulley assembly as claimed in claim 1, wherein said pulley is supported radially by said seismic mass; and in that said first one-way stop means are interposed between said hub and said pulley.

6. A damper pulley assembly as claimed in claim 1, wherein said first one way stop means are interposed between said hub and said seismic mass.

7. A damper pulley assembly as claimed in 1, wherein said elastic means are side by side with said seismic mass.

8. A damper pulley assembly as claimed in claim 1, wherein said seismic mass surrounds said elastic means.

9. A damper pulley assembly as claimed in claim 1, wherein said pulley comprises a multiple-groove wall; and by comprising a stop member fitted inside said multiple-groove wall and cooperating with said hub or said seismic mass to define the axial position of said pulley.

10. A damper pulley assembly as claimed in claim 1, wherein said free end portion slides on said first and second shoes with respect to said pulley before reaching said first or said second stop position.

* * * * *